Patented Jan. 2, 1945

2,366,657

UNITED STATES PATENT OFFICE 2,366,657

ASPHALTIC COMPOSITION AND PROCESS OF MAKING THE SAME

Stanley S. Sorem, Berkeley, Calif., assignor to Shell Development Company, San Francisco, Calif., a corporation of Delaware No Drawing. Application June 13, 1942, Serial No. 446,999

12 Claims. (Cl. 196—22)

This invention relates to hard fusible asphaltic compositions which are solid at ordinary temperatures, substantially completely soluble in carbon disulfide, possess melting temperatures of about 700° F. or above, are less than 5% volatile as determined by A. S. T. M. test D-6-39T, and consist largely of asphaltenes and petrolenes.

Petrolenes, as herein defined, are hydrocarbons of the type normally associated with asphalts. They possess relatively high boiling temperatures and are soluble in 88° Bé. naphtha. They are normally solid or liquid and have Watson characterization factors normally below about 11.5 (see article "Symposium on physical properties of hydrocarbon mixtures" by Watson et al. in Ind. & Eng. Chem., vol. 25, No. 26, August 1935, page 881). Included are various hydrocarbon oils boiling higher than kerosene, i. e. gas oils, light and heavy lubricating oils of relatively low viscosity indexes, e. g. below about 70, or extracts thereof, petroleum resins, albino asphalts, etc. Excluded are paraffin wax, petrolatum, highly paraffinic lubricating oils, etc. for use by themselves, e. g. alone and not in admixture with suitable petrolenes.

Asphaltenes are normal constituents of asphalts which are soluble in carbon disulfide, pyridine, chloroform or benzene, but are insoluble in 88° Bé. naphtha. They are black or brown, normally solid, hard and brittle; have penetrations of approximately 0 (see Abraham's "Asphalts and Allied Substances," 4th ed., D. Van Nostrand & Co., 1938); and are easily reduced to a dry powder. Asphaltenes occur naturally or may be produced by oxidation of petrolenes as by air blowing at elevated temperatures of about 450° F., reaction with sulfur or chlorine, etc. Chemically, they are believed to consist predominantly of saturated or unsaturated aromatic or naphthenic polynuclear hydrocarbons of high carbon-to-hydrogen ratios.

The asphaltic composition of this invention differs from pyrobituminous materials such as petroleum coke, bituminous coal, pure asphaltenes and the like, in that the former, when heated, melts without decomposing. It differs from petroleum asphalts (including blown petroleum asphalts) and natural asphaltites such as gilsonite, glance pitch, grahamite, etc., in that the latter compounds contain lower percentages of asphaltenes, possess softening or melting temperatures (the highest below about 600° F.) substantially below the melting temperature of the composition of this invention, and are more volatile.

The object of this invention is to produce a new hard asphaltic composition having a high melting temperature and containing less than 5% volatile material. Another object is to produce a substitute for friction modifiers such as drying oil resins employed in friction element compositions. Another object is to produce a new asphaltic thermoplastic compound. A further object of this invention is to prepare such an asphalt composition by a new, simple and economical method.

The composition of this invention is manufactured by treating intermediate petroleum asphalts having certain properties with a suitable solvent under certain conditions, which are described later.

Suitable intermediate petroleum asphalts have melting temperatures above about 300° F., penetrations of less than 1, and are substantially completely soluble in carbon disulfide, pyridine, chloroform or benzene. They contain from about 55% to 85% by weight asphaltenes, and about 45% to 15% by weight petrolenes. "Substantially completely soluble" as herein used means at least 98% soluble and preferably 99½% soluble in the solvents, the remaining insoluble portions being impurities such as free carbon and mineral matter.

These intermediate asphalts may be obtained from asphaltic crudes or from cracked residues by distillation, precipitation and/or oxidation. Precipitated asphalts are generally produced by extracting the non-asphaltic constituents from a topped crude or cracked residue by means of a hydrocarbon solvent such as a paraffinic hydrocarbon liquid of less than 6 carbon atoms, e. g. casinghead gasoline, liquid butane, liquid propane, etc. Distilled or precipitated asphalts may be further oxidized to increase their melting temperatures, if too low, as by blowing them with air at an elevated temperature, preferably between about 450° F. and 500° F.

Suitable solvents for the treatment of the intermediate asphalts must possess preferential solvent powers for petrolenes but not asphaltenes. Particularly useful are low boiling petroleum paraffinic naphthas having a Bé. gravity of 60° or higher. It is important that the hydrocarbon solvent for treatment have not too low a gravity, because it would then have insufficient solvent power for the petrolenes, leaving too high a percentage of petrolenes in the product; also the solvent must not have too high a gravity or it would cause softening of the product, making removal of the solvent therefrom by filtration difficult. Some effective solvents include natural gasoline, normal hexane, isopentane, normal pentane, etc. Isopentane or isopentane fractions are preferred. "Isopentane fractions" as used herein are defined to include low boiling hydrocarbon mixtures which contain 50% or more isopentane.

Prior to solvent treating, it is desirable to comminute the intermediate asphalts to insure intimate contact between the asphalt and the solvent. Comminution is preferably carried out at a temperature below about 150° F. and is continued until the asphalt particles will pass through a 20-mesh or finer screen.

The solvent treatment may be carried out by either of two methods. In the first, the solvent is contacted and commingled with a comminuted asphalt for a short period of time, usually about 1 to 10 seconds, preferably 1 to 5 seconds, sufficient to dissolve out only a portion of the petrolenes therein and to raise the melting temperature of the asphalt to above about 700° F. An equilibrium condition between the particles and the solvent is not permitted to be established. The exact amount of petrolenes which must be extracted to result in the desired melting point varies considerably, depending upon the properties of both the petrolenes and asphaltenes. The partially extracted particles are then dried to remove the solvent whereby the desired composition of this invention is obtained.

In the second method, the comminuted asphalt is thoroughly contacted and commingled with the hydrocarbon solvent until equilibrium between the asphalt particles and solvent is substantially established, whereby a substantial portion of the petrolenes is extracted, which portion is much larger than that removed by the first method. The insoluble portion is then separated from the extract and dried. A small amount of oily hydrocarbons or petrolenes is added to and thoroughly commingled with the resulting dried asphalt particles, which amount is sufficient to produce a composition having a melting temperature of above about 700° F., preferably between about 700 and 750° F. Without the addition of this oily material the dried asphalt particles, consisting mostly of asphaltenes, would not melt without disintegration. The exact amount of petrolenes added varies, usually between about 1% and 5% by weight, depending largely on the type of petrolenes used and the properties of the asphaltenes present.

The added oily hydrocarbons or petrolenes are liquids or plastics compatible with the asphaltenes, having lower softening temperatures than the desired asphaltic composition, and comprising the heavier fractions of crude oil such as crude oil distillation residues substantially free from components boiling below about 600° F., blowdown oil from petroleum coke boiling above about 600° F., and lubricating oil extracts from various hydrocarbon oils obtained by a selective solvent having preferential solvent power for aromatic hydrocarbons or mixtures containing them, etc. Extracts, as is known, are obtained for example by extracting topped crudes, bright stocks, lubricating oils or gas oils with sulfur dioxide, nitrobenzene, methyl acetate, phenyl acetate, furfural, acetone, aniline, phenol, cresylic acids, beta, beta'-dichlordiethyl ether, sulfur dioxide-nitrobenzene mixtures, or other selective solvents, or with a combination of solvent and anti-solvent, such as phenol or cresol with propane, etc.

As indicated before, the asphaltic composition of this invention is a hard, dark, solid material, which may be ground to powder for use in moldable and plastic compositions. It has a penetration of substantially less than 1, a melting temperature of about 700° F. or above, preferably between about 700 and 750° F., and is less than 5% by weight volatile by A. S. T. M. method D6–39T. Owing to the fact that near the melting temperature the asphaltic composition becomes rubbery, the determination of the melting point is difficult and its accuracy is only approximate. This composition consists essentially of asphaltenes and petrolenes and is substantially completely soluble (that is, more than 98% soluble) in carbon disulfide, pyridine, chloroform or benzene. It is composed almost completely of asphaltenes and petrolenes containing about 75–98% (97% optimum) asphaltenes and 25–2% petrolenes.

As may be noted, the percentages of asphaltenes and petrolenes in the intermediate and final products may overlap in spite of their difference in properties. This is due to differences in the chemical and physical properties of petrolenes and/or asphaltenes, which may comprise fairly wide classes of different though related compounds.

The apparatus employed in preparing the asphaltic composition of this invention may be of any convenient or conventional type which will withstand the conditions necessary for producing the composition. For example, the blowing of a petroleum asphalt can be carried out in a conventional air-blowing still and the blown asphalt may be run into an open reservoir, from which it may readily be removed; comminuting the blown asphalt may be effected in a grinder similar to a coal pulverizer; commingling of the asphalt with the solvent may be effected in a mixing tank, or a continuous, rotary or vacuum filter; and drying of the asphalt may be effected in a separate drier such as a cone drier, wherein steam may be used. The employment of other necessary pieces of equipment, such as additional grinders, pumps, tanks, driers, filters and the like, is within the knowledge of anyone skilled in the art.

The following specific examples disclose ways in which the particular asphaltic composition of this invention may be produced.

*Example I*

A Mid-Continent propane-precipitated petroleum asphalt was blown with air at 450° F. to produce a blown asphalt having a melting temperature of about 320° F. This material was ground in a mill so that all of it would pass through a 20-mesh screen. This ground asphalt was deposited on a suction filter and washed once with 15 cc. of isopentane per gram of ground asphalt. The washed asphalt was then thoroughly dried on the filter, producing a hard, dry powder having a melting temperature of about 700° F. and being less than 5% volatile. The isopentane employed for washing had the following A. S. T. M. distillation:

| | °C. |
|---|---|
| I. B. P. | 28.0 |
| 10% | 28.5 |
| 50% | 28.5 |
| 90% | 29.5 |
| 95% | 30.5 |

*Example II*

A 6° A. P. I. gravity cracked residue was precipitated with gasoline using about 20 volumes of gasoline per volume of residue. The resulting precipitate, comprising a large portion of asphaltenes, was removed with a centrifuge and washed once through on a filter with 15 cc. of isopentane per gram of precipitate. This precipitate was then dried over superheated steam to produce an asphaltic composition having a melting temperature of about 700° F. and being less than 5% volatile.

*Example III*

A blown petroleum asphalt having a softening point of 326° F. and an A. S. T. M. penetration of 0 at 77° F. was crushed and mixed to a slurry with isopentane, and deposited on a suction filter in a layer ½ to ¾ inch thick. The asphalt thus deposited was washed until free from all soluble components or petrolenes, leaving substantially only the asphaltenes on the filter. These resulting asphaltenes were dried for an hour by blowing superheated steam at 400° F. through the filter. The dry asphaltenes were then removed from the filter and mixed with about 3% of a high aromatic lubricating oil extract. To facilitate the dispersion of the extract in the asphaltenes it was dissolved in gasoline at a concentration of about 15%. When this extract was combined with the asphaltenes, the gasoline therein was evaporated and the extract saturated asphaltene particles were dried again with superheated steam, producing the asphaltic composition having a melting temperature of about 700° F. and being less than 5% volatile.

The asphaltic composition of this invention has several uses, one of which is as a substitute for drying oil resin in friction elements, namely brakeshoes, clutch faces and the like, wherein the heat of friction causes the material to soften and become rubber-like, thereby increasing the friction co-efficient of the brakeshoe. Another use is as a thermoplastic moldable material. Also, its properties make it an efficient extinguisher for incendiary bombs because the heat from the burning bomb melts the composition to form a blanket around the bomb excluding air from it, thus stopping its burning.

I claim as my invention:

1. An asphaltic composition fusible without decomposing, having a melting temperature of about 700° F. or above and a volatility of less than 5% at said temperature, and being substantially completely soluble in carbon disulfide and from 2% to 35% by weight soluble in isopentane.

2. An asphaltic composition fusible without decomposing, consisting essentially of asphaltenes and such an amount of petrolenes that the composition has a melting temperature of about 700° F. or above and is less than 5% volatile at said temperature said composition being substantially completely soluble in carbon disulfide.

3. The composition of claim 2 wherein the melting temperature of the composition is between about 700° F. and 750° F.

4. A thermoplastic moldable composition comprising an asphaltic composition substantially as described in claim 2.

5. A process for producing an asphaltic composition fusible without decomposing, having a melting temperature of about 700° F. or above, and being less than 5% volatile at said temperature and substantially completely soluble in carbon disulfide, from a petroleum asphalt having a melting temperature above about 300° F. and substantially completely soluble in carbon disulfide, comprising extracting said asphalt with an isopentane fraction for a period of time between about 1 and 10 seconds and drying said asphalt.

6. A process for producing an asphaltic composition fusible without decomposing consisting essentially of asphaltenes and petrolenes, having a melting temperature of about 700° F. or above and being less than 5% volatile at said temperature, from a petroleum asphalt consisting essentially of asphaltenes and petrolenes having a melting temperature above about 300° F., and substantially completely soluble in carbon disulfide, comprising extracting said asphalt with an isopentane fraction for a period of time sufficient to dissolve only a portion of the petrolenes therein but not to soften the particles, and drying said asphalt.

7. A process for producing an asphaltic composition fusible without decomposing consisting essentially of asphaltenes and petrolenes, said composition having a melting temperature of about 700° F. or above and being less than 5% volatile at said temperature, from a petroleum asphalt consisting essentially of asphaltenes and petrolenes, having a melting temperature above about 300° F. and substantially completely soluble in carbon disulfide, comprising removing a major portion of said petrolenes therein and adding to the remaining asphaltenes a small amount of an aromatic lubricating oil extract sufficient to produce said composition having a melting temperature of above about 700° F.

8. A process for producing an asphaltic composition fusible without decomposing, having a melting temperature of between about 700° F. and 750° F. and being less than 5% by weight volatile at said temperature, from a petroleum residue, comprising the steps of blowing said residue with air while in the liquid state to enrich it in asphaltenes and to produce an asphalt having a melting temperature above about 300° F. and substantially completely soluble in carbon disulfide, comminuting said asphalt into particles, extracting said asphalt particles with isopentane for a period of time between about 1 and 10 seconds, and drying said asphalt particles.

9. The process of claim 8 wherein said residue is blown with air at a temperature of about 450° F.

10. The process of claim 8 wherein said period of time is between about 1 and 5 seconds.

11. An asphaltic composition fusible without decomposing, consisting essentially of asphaltenes and such an amount of petrolenes that the composition has a melting temperature of about 700° F. or above and is less than 5% volatile at said temperature, said petrolenes comprising at least in part an aromatic lubricating oil extract.

12. An asphaltic composition fusible without decomposing consisting essentially of asphaltenes and petrolenes, said asphaltenes comprising 75% to 98% by weight of the composition and said petrolenes comprising 25% to 2% by weight of the composition, said composition having a melting temperature of about 700° F. or above, being less than 5% volatile at said temperature, and being substantially completely soluble in carbon disulfide.

STANLEY S. SOREM.